US009705352B2

United States Patent
Hur et al.

(10) Patent No.: US 9,705,352 B2
(45) Date of Patent: Jul. 11, 2017

(54) WIRELESS CHARGING METHOD AND APPARATUS

(71) Applicants: HYUNDAI MOTOR COMPANY, Seoul (KR); Kia Motors Corporation, Seoul (KR); Dae Dong Co., LTD., Ansan-si, Gyeonggi-do (KR)

(72) Inventors: Nam Woong Hur, Hwaseong-si (KR); Seul Ki Jeon, Gunsan-si (KR); Hyun Sang Kim, Hwaseong-si (KR); Tae Cheol Lee, Ansan-si (KR); Sam Min Park, Ansan-si (KR)

(73) Assignees: Hyundai Motor Company, Seoul (KR); Kia Motors Corporation, Seoul (KR); Dae Dong Co., Ltd., Ansan-si, Gyeonggi-do (KR)

( * ) Notice: Subject to any disclaimer, the term of this patent is extended or adjusted under 35 U.S.C. 154(b) by 183 days.

(21) Appl. No.: 14/567,565

(22) Filed: Dec. 11, 2014

(65) Prior Publication Data

US 2016/0028251 A1    Jan. 28, 2016

(30) Foreign Application Priority Data

Jul. 23, 2014  (KR) ........................ 10-2014-0093423

(51) Int. Cl.
| | |
|---|---|
| H02J 7/00 | (2006.01) |
| H01F 27/42 | (2006.01) |
| H04B 7/00 | (2006.01) |
| H02J 7/02 | (2016.01) |
| H02J 50/12 | (2016.01) |
| H02J 1/14 | (2006.01) |

(52) U.S. Cl.
CPC ............ *H02J 7/025* (2013.01); *H02J 7/0013* (2013.01); *H02J 50/12* (2016.02); *H02J 1/14* (2013.01); *Y02B 40/90* (2013.01)

(58) Field of Classification Search
CPC ............................... H02J 7/025; H04B 5/0037
USPC .......................... 320/108; 307/104; 455/500
See application file for complete search history.

(56) References Cited

U.S. PATENT DOCUMENTS

| | | | |
|---|---|---|---|
| 7,027,808 B2 * | 4/2006 | Wesby ................... | G06Q 40/00 340/853.1 |
| 8,766,592 B2 * | 7/2014 | Fujita .................... | H02J 7/0027 320/107 |
| 8,780,775 B2 * | 7/2014 | Balasubramaniam | H04W 52/0216 370/311 |

(Continued)

FOREIGN PATENT DOCUMENTS

| | | |
|---|---|---|
| JP | 2010-022105 A | 1/2010 |
| KR | 2003-0093422 A | 12/2003 |

(Continued)

*Primary Examiner* — M'Baye Diao
(74) *Attorney, Agent, or Firm* — McDermott Will & Emery LLP

(57) ABSTRACT

A wireless charging method includes determining whether at least one wireless charging device is in a wireless charging area. When it is determined that there is one wireless charging device in the wireless charging area, the wireless charging device is charged. When it is determined that at least two wireless charging devices are in the wireless charging area, the priority of wireless charging among the at least two wireless charging devices is determined, and the wireless charging device having higher priority is wirelessly charged.

16 Claims, 3 Drawing Sheets

(56) References Cited

U.S. PATENT DOCUMENTS

| | | | | |
|---|---|---|---|---|
| 8,878,393 B2* | 11/2014 | Kirby | .................. | H04B 5/0037 |
| | | | | 307/104 |
| 8,975,864 B2* | 3/2015 | Kim | ..................... | B60L 11/182 |
| | | | | 320/108 |
| 9,431,844 B2* | 8/2016 | Redding | ................. | H02J 5/005 |
| 2011/0050164 A1* | 3/2011 | Partovi | .................. | H01F 5/003 |
| | | | | 320/108 |
| 2015/0357861 A1* | 12/2015 | Muurinen | ............... | H02J 7/025 |
| | | | | 307/104 |

FOREIGN PATENT DOCUMENTS

| | | |
|---|---|---|
| KR | 10-2011-0087639 A | 8/2011 |
| KR | 10-2013-0115394 A | 10/2013 |
| KR | 10-2014-0017768 A | 2/2014 |

\* cited by examiner

WIRELESS CHARGING METHOD AND APPARATUS

CROSS-REFERENCE TO RELATED APPLICATION

This application is based on and claims the benefit of priority to Korean Patent Application No. 10-2014-0093423, filed on Jul. 23, 2014 in the Korean Intellectual Property Office, the disclosure of which is incorporated herein in its entirety by reference.

TECHNICAL FIELD

The present disclosure relates to a wireless charging method and apparatus, and more particularly, to a wireless charging method capable of determining priority when a plurality of wireless charging devices are present to selectively or simultaneously transmit power wirelessly and to an apparatus capable of performing the aforementioned method.

BACKGROUND

A wireless charging technology is a technology of transmitting power required to wirelessly charge a battery without using a power cord or a charging connector. The related art has been used for an electric toothbrush, a home cordless phone, an electrically driven tool, and the like.

However, with a recent explosive increase in the smartphone market, use of a wireless charging technology has accelerated. The smartphone enables a user to freely enjoy abundant contents and multimedia any time, but has a short use time due to a restrictive battery capacity. The environment of the wireless charging technology in the smartphone market has greatly changed with the appearance of a wireless charging smartphone in 2010 and products with a wireless charging module for the purpose of wirelessly charging a mobile phone and a smartphone have been continuously publicized in 2011.

In 2008, the Wireless Power Consortium (WPC) was founded to establish a global standard for wirelessly charging electronic products. After the WPC published its first standard specification for devices having an output of 5 W or less in July 2010, the number of companies in a number of industries joining the WPC have continuously increased. The wireless charging technology market is expanding due to increased popularity of smartphones. The technology is expected to be used for devices having a large output such as a digital camera, a tablet PC, a monitor, a digital TV, and the like, in the future.

Further, when a plurality of wireless charging devices are present, in order to increase user convenience and the efficiency of a charging system, there is a need to determine an order of priority among the plurality of devices to be wirelessly charged, so that the objects given priority are charged first.

SUMMARY

The present disclosure has been made to solve the abovementioned problems occurring in the prior art while maintaining the advantages achieved by the prior art.

An aspect of the present disclosure provides a wireless charging method capable of determining priority among a plurality of wireless charging devices in order to preferentially wirelessly charge a wireless charging device having higher priority, thereby increasing user convenience and charging efficiency. A wireless charging apparatus that performs the abovementioned method is also disclosed herein.

According to an exemplary embodiment of the present disclosure, a wireless charging method includes determining whether at least one wireless charging device is located in a wireless charging area. When it is determined that there is one wireless charging device in the wireless charging area, the one wireless charging device is charged. When it is determined that there are at least two wireless charging devices in the wireless charging area, the priority of wireless charging among the at least two wireless charging devices is determined, and the wireless charging device having higher priority is wirelessly charged.

The wirelessly charging of the wireless charging device having higher priority may include multiple steps. First, a device designated to be preferentially charged among the at least two wireless charging devices may be wirelessly charged. Second, a device having a low battery state-of-charge among the at least two wireless charging devices may be wirelessly charged when the designated device is not present or after the designated device is charged. Third, all of the at least two wireless charging devices may be simultaneously charged when the device having a low battery state-of-charge is not present or after the device having a low battery state-of-charge is charged.

The first step of charging the device designated to be preferentially charged among the at least two wireless charging devices may include determining whether the designated device is present. When it is determined that the designated device is present, the designated device may be preferentially wirelessly charged ahead of other wireless charging devices When the battery state-of-charge of the designated device is charged over a first level, the wireless charging may be stopped and the second step may be performed.

The second step of wirelessly charging the device having a low battery state-of-charge may include determining whether the device having a low battery state-of-charge equal to or lower than a second level is present among the wireless charging devices. When it is determined that the device having a low battery state-of-charge is present, the device having a low battery state-of-charge may be wirelessly charged ahead of other wireless charging devices When the device having a low battery state-of-charge is charged over a third level, the wireless charging may be stopped, and the third step may be performed.

The first level may be selected from the range of 70-100% state-of-charge. The first level may be 80% state-of-charge. The second level may be selected from the range of 10-30% state-of-charge. The second level may be 20% state-of-charge. The third level may be selected from the range of 50-100% state-of-charge. The third level may be 50% state-of-charge.

The wireless charging may be resonance wireless charging and the priority may be determined using Bluetooth low energy (BLE). The present disclosure further provides an apparatus for wireless charging. According to an exemplary embodiment of the present disclosure, an apparatus for wireless charging may include a wireless power transmitter, a controller, and a wireless charging area, wherein at least two wireless charging devices may be detected. The controller may be configured to determine priority of wireless charging among the at least two wireless charging devices and direct the wireless power transmitter to charge the wireless charging device having higher priority.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
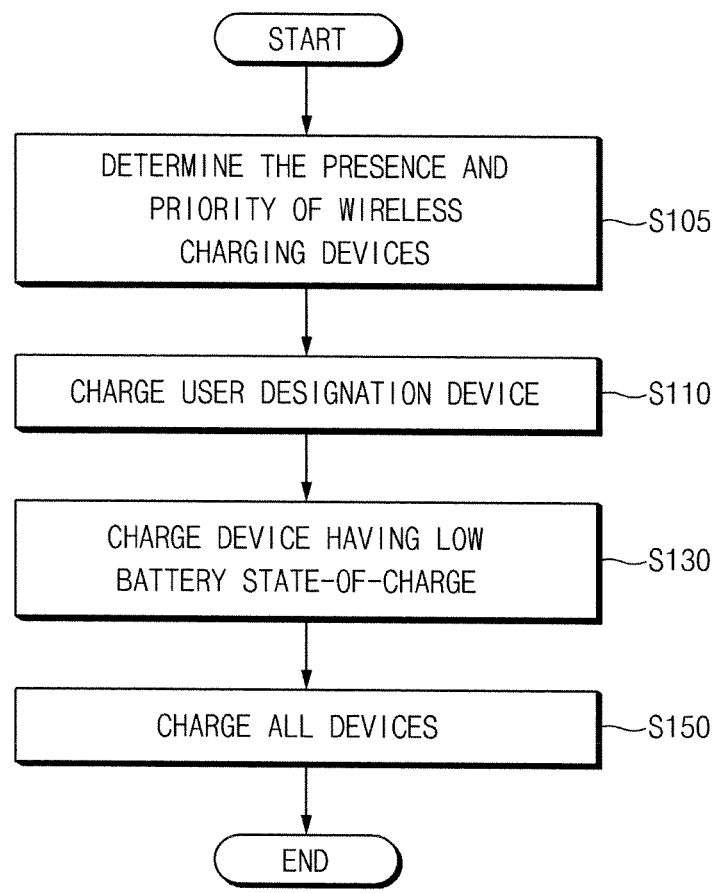
FIG. 1 is a diagram illustrating a wireless charging method according to an exemplary embodiment of the present disclosure.

Advantages and features of the present disclosure and methods to achieve them will be elucidated from exemplary embodiments described below in detail with reference to the accompanying drawings. However, the present disclosure is not limited to the exemplary embodiments set forth herein, but may be modified in many different forms. Merely, these embodiments are provided so that this disclosure will be thorough and complete, and will fully convey the technical spirit of the disclosure to those skilled in the art.

In the drawings, the embodiments of the present disclosure are not limited to the illustrated specific form, and in order to clearly understand and/or easily embody the present disclosure, configurations of the present disclosure will be illustrated in the accompanying drawings. Herein, specific terms have been used, but are just used for the purpose of describing the present disclosure and are not used for qualifying the meaning or limiting the scope of the present disclosure, which is disclosed in the appended claims.

In the present specification, terms 'and/or' are used as a meaning including at least one of components arranged after and before any component. Further, expression 'connected/coupled' is used to include a case in which the components are directly connected with each other or a case in which the components are indirectly connected with each other with other components interposed therebetween. Unless explicitly described to the contrary, a singular form includes a plural form in the present specification. In addition, components, steps, operations, and elements mentioned as 'comprise' or 'comprising' in the present specification do not exclude the existence or addition of one or more other components, steps, operations, and elements.

Hereinafter, exemplary embodiments of the present disclosure will be described in detail with reference to the accompanying drawings.

Generally, a wireless charging system is configured to include a single wireless power transmitter and wireless charging devices. In a case where a single wireless power transmitter is capable of charging multiple devices, it is preferable to charge all of the wireless charging devices at the same time. However, since there is a maximum power value which may be transmitted by the wireless power transmitter, for user convenience and efficient wireless charging, there is a need to determine which one of the plurality of wireless charging devices should be charged ahead of other wireless charging devices.

First, a wireless charging method according to an exemplary embodiment of the present disclosure determines whether wireless charging devices are located in a wireless charging area. When it is determined that there is one wireless charging object in the wireless charging area, the wireless charging device is charged. However, when it is determined that there are at least two wireless charging devices =, priority of wireless charging is determined. The wireless charging device having higher priority is then charged ahead of other wireless charging devices on the basis of the determined priority.

If it is determined that there are at least three wireless charging devices in the wireless charging area, an order of priority of wireless charging among the at least three wireless charging devices is determined, and the wireless charging devices are charged in the order of priority.

Hereinafter, a determination criterion of the priority will be described in detail.

FIG. 1 is a diagram illustrating a wireless charging method according to an exemplary embodiment of the present disclosure. Referring to FIG. 1, the wireless charging method includes steps S105 to S150.

When a plurality of wireless charging devices are located within a wireless charging area of a wireless power transmitter, there may be a device having highest priority from a user's viewpoint. In this case, the device needs to be wirelessly charged ahead of other wireless charging devices. Therefore, it is preferable to wirelessly charge the device and then wirelessly charge the other remaining devices.

To this end, the wireless charging method according to the exemplary embodiment of the present disclosure determines the presence and priority of wireless charging devices in a wireless charging area (S105). Once the presence and priority of the devices have been determined, the method allows a user to wirelessly charge devices designated to be charged ahead of other devices (S110).

Further, after the user-designated device has been charged, devices having a relatively (or absolutely) low battery state-of-charge may be charged ahead of other devices (S130).

Next, all the wireless charging object devices located in the wireless charging area are wirelessly charged simultaneously (S150).

As the result, the wireless charging method according to the exemplary embodiment of the present disclosure may rapidly wirelessly charge a user-designated device before charging other devices, thereby increasing the convenience of using the wireless charging system and the charging efficiency of the wireless charging system.

Figure 2:
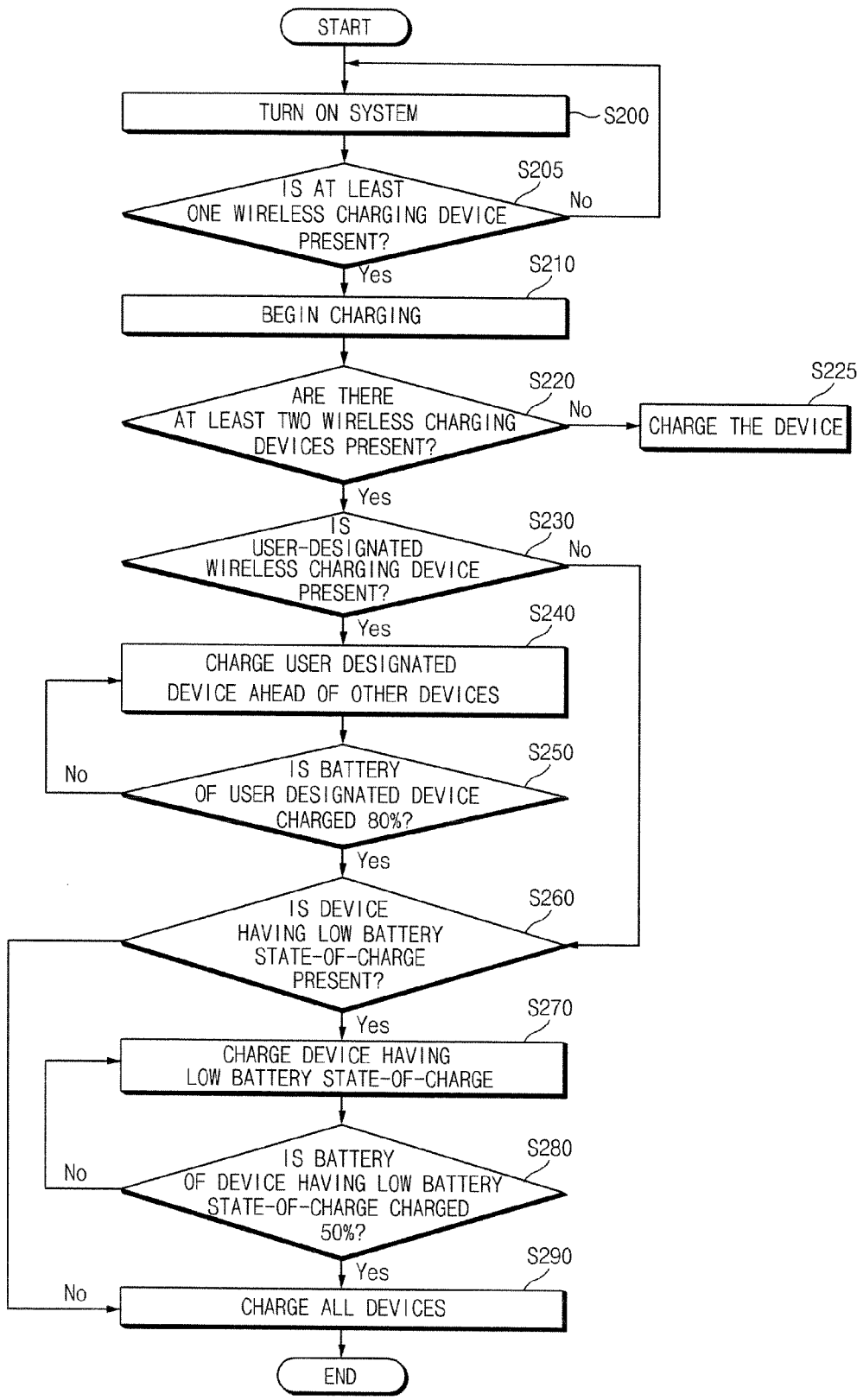
FIG. 2 is a diagram illustrating in detail a wireless charging method according to an exemplary embodiment of the present disclosure.

FIG. 2 is a diagram illustrating in detail a wireless charging method according to an exemplary embodiment of the present disclosure.

First, after the wireless charging system is turned on (S200), it is determined whether at least one wireless charging device is located in the wireless charging area (S205). If yes, the system begins charging (s210).

Next, it is determined whether there are at least two wireless charging devices present (s220). If there is only one wireless charging device present, that device is charged (s225).

If at least two wireless charging object devices are present, it is determined whether a user-designated device designated to be wirelessly charged ahead of other devices is present (S230). When it is determined that the user designation device is not present, the process proceeds to step S260 and when the user designation device is present, the method proceeds to step S240.

Next, when it is determined in step s230 that the user-designated device is present, the device is wirelessly charged ahead of other devices (S240).

Next, a battery of the user-designated device may be fully charged (100% state-of-charge), but to efficiently use the wireless charging system, when a battery state-of-charge of the user-designated device is charged over a certain first level, the device may be used, and other devices may be charged. In step s250 of FIG. 2, the first level is 80% state-of-charge. However, the first level is variable. The first level may be selected from, but not limited to, the range of 70-100% state-of-charge.

Here, the battery state-of-charge may be determined by communication between the wireless power transmitter and the wireless charging device based on Bluetooth low energy (BLE) in a resonance wireless charging system. When it is determined that the battery state-of-charge of the device has not reached the first level, the process returns to step S240, and thus the device is continuously wirelessly charged until the battery state-of-charge reaches the first level, upon which the method proceeds to step S260.

In the aforementioned steps S230 to S250, when a battery of a user-designated device is charged over the first level, the battery of the device has enough charge for immediate use, and therefore the wireless charging of other devices is performed.

First, a device having a low battery state-of-charge among other devices other than the device is determined (S260). As described in step S250, the battery state-of-charge of a device in a resonance wireless charging system may be determined by, but not limited to, use of wireless communication based on Bluetooth low energy (BLE).

Further, the wireless charging method according to an exemplary embodiment of the present disclosure may relatively determine the device having a low battery state-of-charge, but may determine a device having a low battery state-of-charge based on an absolute criterion (second level). For example, a device having a battery state-of-charge equal to or less than 20% state-of-charge may be determined. The second level is variable. It may be selected from, but not limited to, the range of 10-30% state-of-charge.

When it is determined that the wireless charging object device having a battery state-of-charge lower than the second level is not present, the method proceeds to step S290 and when the wireless charging object device having a battery state-of-charge lower than the second level is present, the method proceeds to step S270.

Next, a device having a low battery state-of-charge determined in step S260 is wirelessly charged (S270).

Here, all the batteries of devices having a low battery state-of-charge may be fully charged (100% state-of-charge), but to efficiently use the wireless charging system, when the battery state-of-charge of the device having a low battery state-of-charge is charged over a third level, the device may be comfortably used, and therefore the wireless charging method according to the exemplary embodiment of the present disclosure may perform the wireless charging of other wireless charging devices. The example given in FIG. 2 step s280 is 50% state-of-charge. However, the third level is variable. It may be selected, but not limited to, the range of 50-100% state-of-charge. When it is determined that the battery state-of-charge of the device having a low battery state-of-charge has not reached the third level, the method returns to step S270, and thus the device having a low battery state-of-charge is continuously charged wirelessly until the battery state-of-charge reaches the third level, upon which the method proceeds to step S290.

As the result, by the aforementioned steps S230 to S280, when a device having an absolutely (or relatively) low battery state-of-charge from the user's viewpoint is charged over the first level or the third level, the device has enough charge for the immediate use, and therefore all the remaining devices are wirelessly charged simultaneously (S290).

The first, second, and third levels in the wireless charging method according to the exemplary embodiment of the present disclosure may be set in advance by the user as needed, and therefore the user may efficiently use the wireless charging system on the basis of the user pattern.

As the result, the wireless charging method according to the exemplary embodiment of the present disclosure classifies the plurality of wireless charging object devices according to priority based on the user designation or on the battery state-of-charge to wirelessly charge the wireless charging device having higher priority ahead of other wireless charging devices, thereby automatically maintaining the batteries of the devices such as a mobile phone to be continuously maintained w within a certain range and increasing the user convenience and the charging efficiency of the wireless charging system.

Figure 3A:
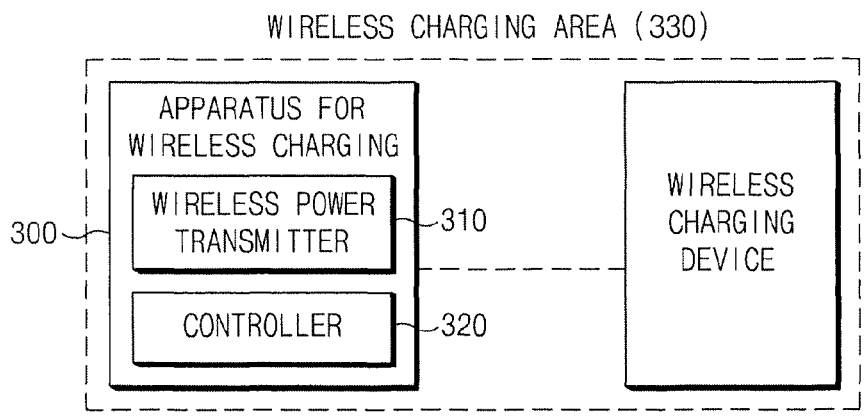
FIG. 3A is a block diagram illustrating an apparatus for wireless charging with one wireless charging device and FIG. 3B is a block diagram illustrating an apparatus for wireless charging with at least two wireless charging devices.
Figure 3B:
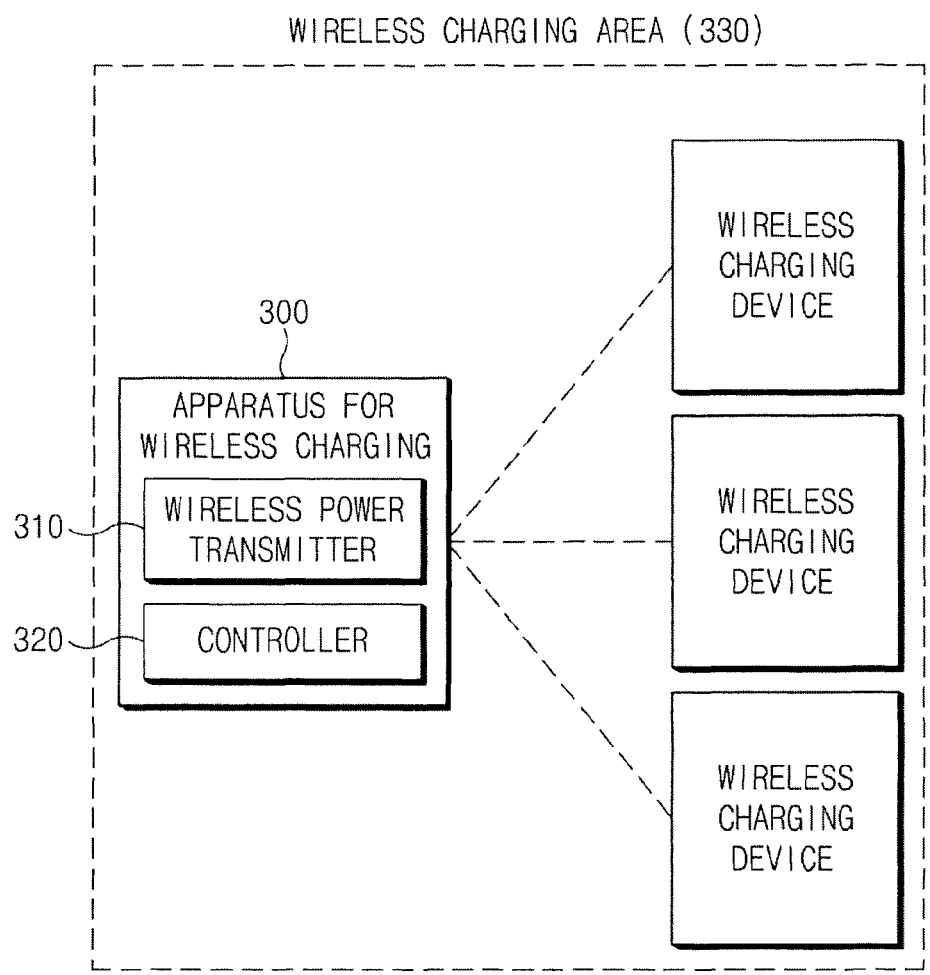

A wireless charging apparatus may be formed to operate according to the method described above. FIG. 3A is a block diagram illustrating an apparatus for wireless charging with one wireless charging device and FIG. 3B is a block diagram illustrating an apparatus for wireless charging with at least two wireless charging devices. The apparatus for wireless charging 300 may comprise a wireless power transmitter 310, a controller 320, and a wireless charging area 330 capable of receiving and detecting the presence of wireless charging devices. The controller 320 determines the priority of charging among the devices according to the method described above and directs the wireless power transmitter 310 to charge them accordingly.

The controller 320 may be configured to first wirelessly charge a device designated to be preferentially charged. It may be configured further to detect and wirelessly charge a device having a low battery state-of-charge if it does not detect any device with preferential designation or if a user-designated device has already been charged. The controller 320 may be configured to charge all devices simultaneously if there is neither a designated device nor a low-battery device present, or if all devices belonging to the above described categories have already been charged. The controller 320 may be further configured to stop charging the designated device once the battery state-of-charge of the designated device reaches a first level of charge. The first level may be selected from the range of 70-100% state-of-charge. In certain embodiments, it may be 80% state-of-charge.

The controller 320 may be further configured to determine whether a device has a low battery state-of-charge if the state-of-charge is equal to or lower than a second level. The second level may be selected from the range of 10-30% state-of-charge. In certain embodiments, the second level may be 20% state-of-charge.

The controller 320 may be further configured to stop charging the device having a low battery state-of-charge when the state-of-charge of the device reaches a third level. The third level may be selected from the range of 50-100% state-of-charge. In certain embodiments, the third level may be 50% state-of-charge.

As described above, according to the exemplary embodiments of the present disclosure, it is possible to determine priority among the plurality of wireless charging devices to preferentially charge wirelessly the wireless charging device having higher priority, thereby increasing user convenience and charging efficiency.

Hereinabove, although the present disclosure has been disclosed with reference to detailed exemplary embodiment, it will be appreciated that the present disclosure may be variously changed without departing from the scope of the present disclosure. Accordingly, the scope of the present disclosure is not construed as being limited to the described embodiments but is defined by the appended claims as well as equivalents thereto. Considering the foregoing contents, when modifications and changes of the present disclosure belong to the following claims and equivalents, it is considered that the present disclosure includes the changes and modifications of the present disclosure.

What is claimed is:

1. A wireless charging method, comprising:
   determining, by a controller of an apparatus for wireless charging including a wireless power transmitter, whether at least one wireless charging device is in a wireless charging area of the apparatus for wireless charging;
   when it is determined that there is one wireless charging device in the wireless charging area, charging, by the wireless power transmitter, the one wireless charging device; and
   when it is determined that there are at least two wireless charging devices in the wireless charging area, determining, by the controller, priority of wireless charging among the at least two wireless charging devices and wirelessly charging, by the wireless power transmitter, the wireless charging device having higher priority,
   wherein the wirelessly charging of the wireless charging device having higher priority includes:
      a first step of charging wirelessly a device designated in advance to be preferentially charged among the at least two wireless charging devices;
      a second step of wirelessly charging a device having a low battery state-of-charge among the at least two wireless charging devices when the designated device is not present or after the designated device is charged; and
      a third step of simultaneously charging wirelessly all of the at least two wireless charging devices when the device having a low battery state is not present or after the device having a low battery state-of-charge is charged.

2. The wireless charging method according to claim 1, wherein the first step of charging the device designated in advance to be preferentially charged among the at least two wireless charging devices includes:
   determining whether the designated device is present;
   when it is determined that the designated device is present, charging wirelessly the designated device ahead of other wireless charging devices; and
   when the battery state-of-charge of the designated device is charged over a first level, stopping the wireless charging and proceeding to the second step.

3. The wireless charging method according to claim 1, wherein the second step of wirelessly charging the device having a low battery state-of-charge includes:
   determining whether the device having a low battery state-of-charge which is equal to or lower than a second level is present among the at least two wireless charging devices;
   when it is determined that the device having a low battery state is present, charging wirelessly the device having a low battery state ahead of other wireless charging object devices; and
   when the device having a low battery state-of-charge is charged over a third level, stopping the wireless charging and proceeding to the third step.

4. The wireless charging method according to claim 2, wherein the first level is selected from the range of 70-100% state-of-charge.

5. The wireless charging method according to claim 4, wherein the first level is 80% state-of-charge.

6. The wireless charging method according to claim 3, wherein the second level is selected from the range of 10-30% state-of-charge and the third level is selected from the range of 50-100% state-of-charge.

7. The wireless charging method according to claim 6, wherein the second level is 20% state-of-charge and the third level is 50% state-of-charge.

8. The wireless charging method according to claim 1, wherein the wireless charging is a resonance wireless charging and
   the priority is determined using Bluetooth low energy wireless communication.

9. The wireless charging method of claim 1, wherein when it is determined that there are at least three wireless charging devices in the wireless charging area, determining an order of priority of wireless charging among the at least three wireless charging devices and wirelessly charging the wireless charging devices in the order of priority.

10. An apparatus for wireless charging, comprising:
    a wireless power transmitter;
    a controller, and
    a wireless charging area,
    wherein the controller detects at least two wireless charging devices, and wherein the controller is configured to determine priority of wireless charging among the at least two wireless charging devices and direct the wireless power transmitter to charge the wireless charging device having higher priority,
    wherein the controller is further configured to:
       wirelessly charge a device designated to be preferentially charged among the at least two wireless charging devices;
       wirelessly charge a device having a low battery state-of-charge among the at least two wireless charging devices when the designated device is not present or after the designated device is charged; and
       when the device having a low battery state-of-charge is not present or after the device having a low battery state-of-charge is charged, simultaneously wirelessly charge all of the at least two wireless charging devices.

11. The apparatus of claim 10, wherein the controller is further configured to:
    determine whether the designated device is present;
    when it is determined that the designated device is present, wirelessly charge the designated device ahead of other wireless charging devices; and
    when the battery state-of-charge of the designated device is charged over a first level, stop the wireless charging and wirelessly charge a device having a low battery state-of-charge among the at least two wireless charging devices when the designated device is not present or after the designated device is charged.

12. The apparatus of claim 10, wherein the controller is configured to:

determine whether the device having a low battery state-of-charge which is equal to or lower than a second level is present among the at least two wireless charging devices;

when it is determined that the device having a low battery state is present, preferentially wirelessly charge the device having a low battery state-of-charge ahead of other wireless charging object devices; and when the device having a low battery state-of-charge is charged over a third level, stop the wireless charging and simultaneously wirelessly charge all of the at least two wireless charging devices when the device having a low battery state-of-charge is not present or after the device having a low battery state-of-charge is charged.

13. The apparatus of claim 11, wherein the first level is selected from the range of 70-100% state-of-charge.

14. The apparatus of claim 13, wherein the first level is 80% state of charge.

15. The apparatus of claim 12, wherein the second level is selected from the range of 10-30% state-of-charge and the third level is selected from the range of 50-100% state-of-charge.

16. The apparatus of claim 15, wherein the second level is 20% state-of-charge and the third level is 50% state-of-charge.

* * * * *